Nov. 29, 1966 W. D. SCHAEFFER 3,288,845
METHOD OF PREPARING UNSATURATED ESTERS
BY OXIDATION OF OLEFINS
Filed Sept. 30, 1963
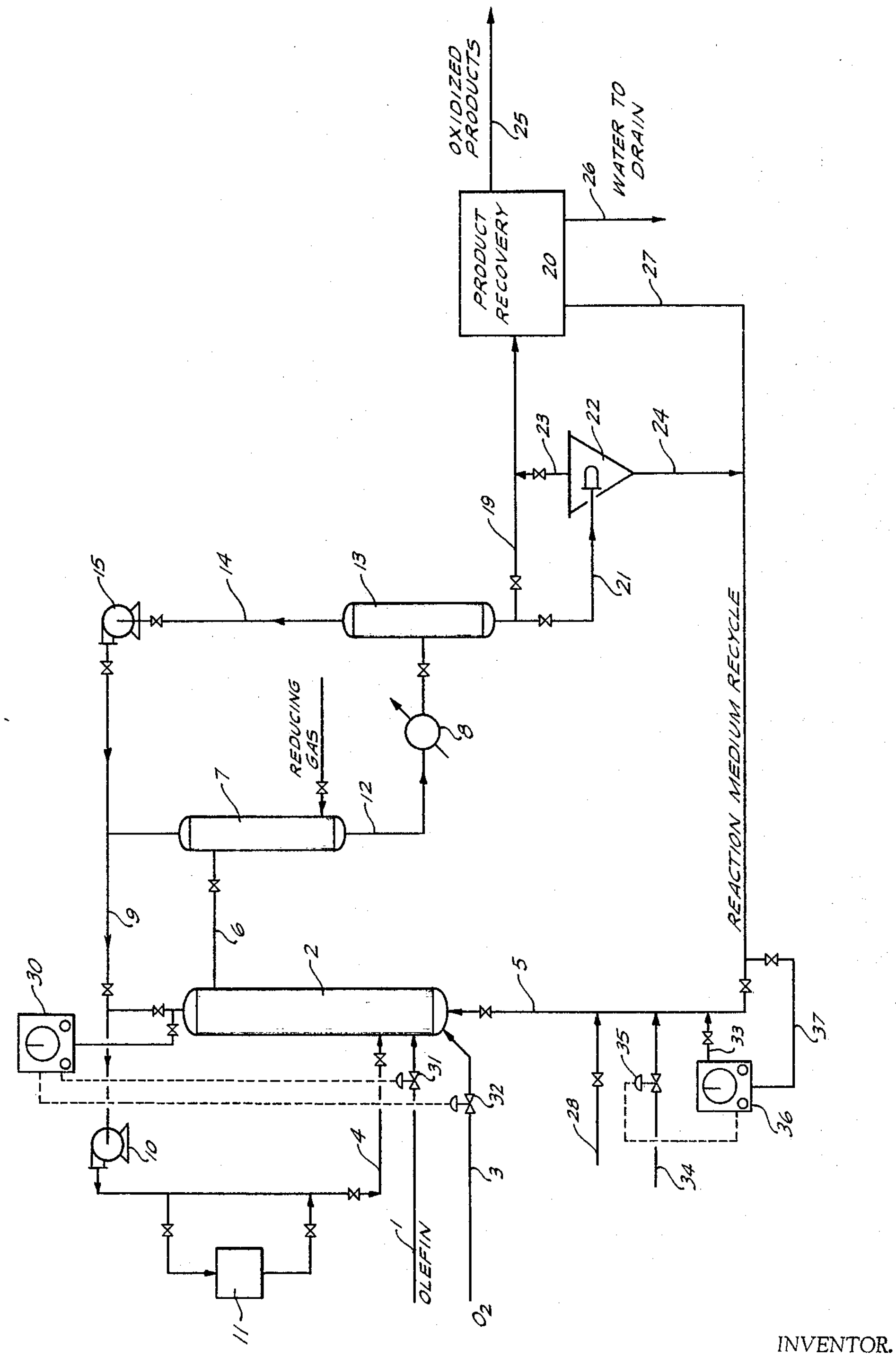
INVENTOR.
WILLIAM D. SCHAEFFER
BY
Robert Strauss
ATTORNEY United States Patent Office 3,288,845
Patented Nov. 29, 1966

3,288,845
METHOD OF PREPARING UNSATURATED ESTERS BY OXIDATION OF OLEFINS

William D. Schaeffer, Pomona, Calif., assignor to Union Oil Company of California, Los Angeles, Calif., a corporation of California Filed Sept. 30, 1963, Ser. No. 312,646
6 Claims. (Cl. 260—497)

This invention relates to the oxidation of olefins to carbonyl compounds by the use of organic solution containing catalytic amounts of a platinum group metal and a heavy metal redox salt and, in particular, relates to a method for preventing the formation of precipitates from the solutions during the process and recovery of the oxidized product.

In a particular embodiment, this invention relates to the oxidation of ethylene to vinyl acetate and acetaldehyde in the presence of an acetic acid solution containing a platinum group metal, particularly solutions containing palladium.

In the aforementioned oxidation of olefinic compounds by contacting the olefin with oxygen and an organic solution containing catalytic amounts of a platinum group metal, the reaction involves the simultaneous reduction of the dissolved metal ions to the free metal and the reoxidation of the metal to dissolved ions. Additionally, various heavy metal redox salts such as copper and iron also fluctuate between their high and low oxidation state during the reaction. Consequently, the solution withdrawn as a crude product from the reactor contains the platinum group metal as suspended particles of the free metal and as the dissolved ion together with both the high and low oxidation states of the heavy metal redox salt.

Although some of the difficulties in handling this crude product can be circumvented by filtering the liquid to remove the suspended solids, the presence of the higher oxidation state of the heavy metal redox agent together with a finite amount of ions of the platinum group metal may cause the platinum group metal to subsequently precipitate as a tenacious film or deposit on the surfaces of the distillation equipment. The use of titanium linings in the equipment reduces this problem somewhat as platinum group metals do not adhere as tenaciously to titanium as to other surfaces. The platinum group metal deposits however form crusts that can cause difficulties by clogging transfer lines, heat exchange surfaces, etc.

In my co-pending application Serial Number 299,936, I have disclosed that this behavior upon distillation can be avoided by treating the crude product with a reducing gas prior to its handling and distillation for recovery of the oxidized products. As disclosed in said application, the crude product can be passed through a reducing guard chamber or vessel where it is contacted with a reducing gas such as carbon monoxide or hydrocarbon olefins having from about 2 to about 5 carbon atoms, e.g., ethylene, propylene, butene, pentene, isobutene, etc. In a desirable operation, the olefin employed for the reducing treatment is the same as that employed in the oxidation and the excess gas from the reducing treatment is recycled together with the recycle gas from the reaction itself for further contacting and oxidation to the desired carbonyl compounds.

Also disclosed in said co-pending application, is the method of controlling the reaction so as to "starve" the oxidation for oxygen. By this procedure, a reducing environment can be achieved in the oxidation reactor itself and the aforesaid reducing guard chamber can be eliminated or employed only to insure against upsets in the reaction itself. The control can be achieved by withdrawing a continuous sample of the recycle gases or reactor vapor space and passing the withdrawn sample through a continuous oxygen analyzer. The indication of oxygen content of this meter can be set to automatically control the relative rates of oxygen and olefin supply to the oxidation to maintain the oxygen content of the reactor exit gases to less than 2 volume percent, preferably less than 1 volume percent, and most preferably, less than 0.5 volume percent. If desired, other controls such as the use of increased reactor pressure, temperature or other changes in the catalyst components can be made to insure that the exit gases from the oxidation comprise a reducing environment. Examples of such changes would be the addition of a nitrogen oxide and/or additional amounts of said heavy metal redox compound and in particular, the combined used of both the nitrogen oxide and a heavy metal salt.

While the aforementioned treatment with a reducing gas very effectively prevents the subsequent formation of tenacious mirrors or deposits of the platinum group metal on the distillation equipment, I have found that this reducing treatment will frequently cause precipitation of the heavy metal redox agent. The reduction treatment of the reactor effluent reduces the redox agent to its lower valence state, i.e., cupric to cuprous, ferric to ferrous, etc. and reduces the platinum group metal to its metallic or lower valence state. Because the platinum group metal is thereby rendered insoluble in the reactor effluent, it can be retained in the reactor or guard vessel and the succeeding treatments of the reactor effluent are freed of any problems normally caused by this component of the catalyst. I have found, however, that the heavy metal redox salt often precipitates from solution in its lower valence state. Separation of this precipitate from the reactor effluent complicates the reconstitution of the liquid recycle reaction medium. Additionally, the clarified reactor effluent remains saturated with the lower valence redox heavy metal salt and subsequent distillation of the volatile products and removal of water from the reaction medium causes crystallization of additional amounts of the heavy metal redox salt. Accordingly, it is desired that a method to avoid this precipitation be devised.

It is an object of this invention to provide an efficient method for the oxidation of olefins to valuable oxidized products.

It is also an object of this invention to prevent the precipitation of adherent deposits of platinum group metal catalysts, particularly palladium, on the surfaces of equipment employed in said oxidation and recovery of the oxidized product.

It is a further object of this invention to avoid the precipitation of the heavy metal redox salt employed in the oxidation.

It is a further object of this invention to provide an efficient distillation method for the recovery of the oxidized product from the crude oxidate.

It is also a further object of this invention to provide a method for controlling the aforesaid oxidation process.

Other and related objects of this invention will be apparent from the following description of the invention:

I have now found that the precipitation of the lower valence state of the heavy metal redox salt can be prevented by maintaining a minimum atomic ratio of halogen to heavy metal. In general, the halide ratio should be maintained greater than about 6.5:1 and preferably greater than about 7.5:1 to prevent the precipitation of the heavy metal redox salt, in particular, the precipitation of cuprous halide. Because there occurs during the oxidation and subsequent distillation of the product an unavoidable loss of halogen, it is desired to continuously analyze the recycle catalyst solution for halogen content and to continuously add the necessary amount of halogen to maintain the aforesaid ratio. As previously mentioned, the careful control of the halogen to heavy metal molar ratio is particularly desirable in combination with the reduction treatment disclosed in my aforesaid co-pending application. In this manner, a control of the oxidation system can be provided that substantially eliminates any problems in the distillation and recovery of the oxidized product caused by instability or insolubility of the catalytic and redox salts used in the oxidation system.

As previously mentioned, the catalyst solution contains catalytic amounts of a palladium group metal and a halogen, i.e., a bromine or chlorine containing compound. The platinum group metal can be of the palladium sub-group or the platinum sub-group, i.e., palladium, rhodium, ruthenium or platinum, osmium, or iridium. While all of these metals are active for the reaction, I prefer palladium because of its much greater activity. The platinum group metal can be employed in amounts between about 0.001 and about 5 weight percent of the liquid reaction medium, however, the reaction rate decreases at concentrations of platinum group metal less than about 0.04 weight percent and amounts of the metal in excess of about 2.0 weight percent do not appreciably increase the rate of oxidation. Accordingly, the preferred limit of the metal in between about 0.04 and about 2.0 weight percent of the catalyst solution. The platinum group metal can be added to the reaction medium as finely-divided metal, as a soluble salt or as a chelate. Examples of suitable salts are the halides and acetates such as palladium chloride, rhodium acetate, ruthenium bromide, osmium oxide, iridium chloride and palladium chloride. Examples of suitable chelates are palladium acetylacetonate and complexes of noble metal ions with such conventional chelating agents as tetraacetic acid, citric acid, etc.

The other necessary component of my catalyst solution is a halogen, i.e., bromine or chlorine containing compound. The halogen can be added as elemental chlorine or bromine; however, it is preferred to employ less volatile halogen compounds such as hydrogen chloride; hydrogen bromide; alkali metal halides, e.g., sodium chloride, lithium bromide, cesium chloride, potassium bromide, sodium bromate, lithium chlorate; ammonium halides, ammonium bromide, ammonium chloride, or any of the aforementioned platinum metal bromides or chlorides. Various organic compounds which liberate hydrogen halide or halogen under the reaction conditions can be used, such as aliphatic chlorides or bromides, e.g., ethyl bromide, propyl chloride, butyl chloride, benzyl bromide, phosgene, etc. In general, sufficient of the aforementioned halogen containing compounds should be added to provide between about 0.05 and about 5.0 weight percent free or coordinately bonded or covalently bonded halogen in the reaction zone; preferably concentrations between about 0.1 and about 3.0 are employed. While chlorine containing compounds are generally preferred, bromine compounds can be preferred for certain reactions, e.g., in substantially anhydrous acetic acid, bromine compounds tend to favor oxidation of ethylene to vinyl acetate whereas chlorine compounds tend to favor the oxidation of ethylene to acetaldehyde and, ultimately, to acetic acid.

As previously mentioned, the reaction medium preferably comprises a substantially anhydrous organic solvent. In general, the water content of the reaction medium should be less than about 20 weight percent, preferably less than about 10 percent and, most preferably, less than about 3 weight percent. During the oxidation of the olefin, water is formed and accumulates in the reaction medium. Accordingly, it is preferred to recycle the reaction medium as a substantially anhydrous liquid and to employ relatively high liquid space rates to prevent the accumulation of amounts of water in excess of those previously stated. In general, the presence of the water in the reaction medium favors the oxidation of the olefin to aldehydes or ketones whereas the oxidation in anhydrous or substantially anhydrous organic media favors more valuable oxidized products such as the desired unsaturated esters.

For the preparation of unsaturated esters of carboxylic acids, the reaction medium should comprise a carboxylic acid preferably having 2 to about 10 carbons, such as acetic, propionic, butyric, valeric, isovaleric, caprylic, isocaprylic, succinic, glutaric, adipic, pimellic, etc. Monocarboxylic acids having 2 to 5 carbons are most preferred. Preferably, the carboxylic acid employed is the acid of the desired acetoxy radical desired in the unsaturated ester, e.g., acetic acid is used in the preparation of vinyl acetate, propionic acid is employed in the preparation of vinyl propionates, etc.

Various other inert organic solvents can be employed in addition to the aforementioned carboxylic acid. Examples of various organic liquids that can also be present in amounts between about 0 and about 90 percent of the reaction medium employed for the synthesis of the unsaturated esters include formamide, dimethyl formamide, chlorobenzene, dichlorobenzene, aliphatic hydrocarbons such as hexane, decane, dodecane, etc.; toluene, xylene, pseudocumene, etc.

In the oxidation of olefins to unsaturated esters, the yields of ester product can be greatly increased by the addition of various carboxylate salts to the reaction medium. Generally, any soluble carboxylate salt can be added such as alkali metal carboxylates, alkaline earth carboxylates, any of the aforementioned Group VIII noble metal carboxylates or a carboxylate salt of the optional redox metals hereinafter described. The alkali metal carboxylates are preferred for their greater solubility in the organic reaction medium and of these, lithium carboxylates are most preferred. Generally, between about 0.1 and about 10 weight percent of a soluble carboxylate salt is added, preferably between about 0.5 and about 5.0 weight percent is employed. The particular alkali metal chosen has some effect on the distribution of products in the unsaturated ester production, particularly the vinyl acetate synthesis. To illustrate, the use of sodium and potassium acetates generally favor acetaldehyde and vinyl acetate production and the lithium salts favor acetic acid production. Lithium salts, however, are preferred in this oxidation because of their greater solubility and hence, the greater acetate ion concentration that can be achieved with the use of lithium.

It is of course apparent that the carboxylate salts can be formed in situ by the addition of the hydroxides of most of the aforementioned metals, particularly the alkali metal hydroxides or halides.

As previously mentioned, various redox compounds can, optionally, be used in the reaction medium. In general, any multivalent metal salt having an oxidation potential higher, i.e., most positive, than the platinum metal in the solution can be used. Typical of such are the soluble salts of multivalent metal ions such as the acetates, bromides or chlorides of copper, iron, manganese, cobalt, mercury, nickel, cerium, uranium, bismuth, tantalum, chromium, molybdenum or vanadium. Of these, cupric and ferric salts are preferred and cupric salts are most preferred, particularly in the substantially anhydrous medium where the cupric salts appreciably increase the rate of oxidation. In general, cupric acetate, chloride or bromide is added to the reaction medium to provide a concentration of copper therein between about 0.1 and about 5 weight percent; preferably between about 0.5 and about 3.0 weight percent.

Various other oxidizing agents can also be employed to accelerate the rate of reaction. Included in such agents are the nitrogen oxides that function in a manner similar to the redox agents previously described. These nitrogen oxides can be employed as the only redox agent in the reaction medium or they can be employed jointly with the aforedescribed redox metal salts such as cupric or ferric salts. In general, between about 0.01 and about 3 weight percent of the reaction medium; preferably between about 0.1 and about 1 weight percent; calculated as nitrogen dioxide can comprise a nitrogen oxide that is added as a nitrate or nitrite salt or nitrogen oxide vapors. The nitrogen oxides can be added to the reaction medium in various forms, e.g., nitrogen oxide vapors such as nitric oxide, nitrogen dioxide, nitrogen tetraoxide, etc. can be introduced into the reaction medium or soluble nitrate or nitrite salts such as sodium nitrate, lithium nitrate, lithium nitrite, potassium nitrate, cesium nitrate, etc., can be added to the reaction medium. In general, the use of these nitrate redox agents are preferred in anhydrous systems and the combined use of cupric salts and nitrate co-redox agents is most preferred for the low temperature operations where the reaction rate would otherwise be prohibitively slow. The use of the nitrogen oxide as redox agents does not appreciably alter the yields of the major products, i.e., vinyl acetate, acetaldehyde and/or acetic acid.

In general, the oxidation of olefins to unsaturated esters, e.g., ethylene to vinyl acetate, propylene to isopropenyl acetate and acetone, etc., is performed by introducing oxygen or an oxygen containing gas and the olefin into contact with the catalyst at temperatures between about 30° and about 300° C.; 90° to about 180° C. are preferred, and to obtain optimum yields of unsaturated esters, temperatures between about 120° and about 160° C. are most preferred. In general, the oxidation of ethylene to high yields of acetic acid is favored at higher temperatures and therefore, when operating so as to generate sufficient acetic acid in situ to equal that consumed in the formation of vinyl acetate, the higher temperatures are preferred in this synthesis, from about 130° to about 180° C.

The reaction pressures employed in either oxidation are sufficient to maintain liquid phase conditions and from about atmospheric to about 100 atmospheres or more, preferably elevated pressures from about 10 to about 75 atmospheres are employed and, most preferably, pressures from about 40 to about 75 atmospheres are used to obtain a high reaction rate. In general, high ethylene partial pressures result in maximum rates of oxidation. Additionally, the use of high ethylene partial pressures in the synthesis of vinyl acetate results in maximum acetaldehyde and vinyl acetate synthesis.

Under the aforedescribed conditions, the olefin is rapidly oxidized to the desired compounds. In general, the liquid catalyst solution is supplied and recycled to the reaction zone at maximum rates to prevent the accumulation of substantial amounts of water that will otherwise reduce the rate of oxidation.

The figure illustrates a process employing my invention. As illustrated, an olefin such as ethylene, propylene, butene-1 or pentene-1; preferably ethylene; is introduced through line 1 to reactor 2. Oxygen or a suitable oxygen containing gas such as air or mixtures of oxygen with air and/or a suitable inert gas, e.g., nitrogen, carbon dioxide, etc., is introduced through line 3 as the source of oxidant. The reactor 2 can be a suitable stirred liquid phase reactor or, if desired, can be packed with a suitable inert medium such as silica gel, diatomaceous earth, titania, carborundum, carbon, etc. Recycle ethylene is returned to the reactor through gas recycle line 4 and the catalyst solution is introduced to the reactor through liquid recycle line 5. The crude oxidation product is removed through line 6 and passed to guard chamber 7 where it is contacted with any of the aforementioned reducing gases. Preferably, high pressures, e.g., 10 to about 100 atmospheres, are used in this step at temperatures between about 30° C. to about 300° C. Most preferably, the guard chamber is operated under the pressure and temperature conditions previously set forth for the reaction in reactor 2.

The gases from the reduction guard chamber are passed through line 9, combined with the reactor 2 effluent gases and the combined gas stream is repressured with compressor 10 for recycling to the reactor through conduit 4. In the preferred process, an oxygen analyzer and meter 30 can be used to measure the oxygen content of the reactor effluent gases or of the vapors within the upper portion of reactor 2. The meter can be set to automatically control this variable by controlling the setting of flow control valves 31 and/or 32 to decrease the relative rate of oxygen supply to reactor 2 when the measured oxygen content exceeds the aforementioned predetermined levels. Because some fixed gases accumulate during the oxidation, such as carbon oxides formed in reactor 2 or in guard chamber 7 when carbon monoxide is used as the reducing gas, it is preferred to pass all or a portion of the recycle gas stream through a suitable fixed gas removal step shown at 11. Examples of suitable removal of fixed gases can be treatment of the recycle gas stream with an alkali metal hydroxide solution ethanolamine solution or an alkali metal carboante solution, etc.

The reduced liquid crude product is removed from guard chamber tower 7 through line 12, cooled in cooler 8 and passed to a flash zone 13 where the residual or soluble ethylene and other gases are separated through line 14, repressured by compressor 15 for recycling to reactor 2.

The crude product from the flash zone 13 comprises a slurry of the finely divided platinum group metal. This slurry can be handled under most circumstances in the subsequent product recovery zone and, accordingly, is passed through line 19 directly to the product recovery steps in zone 20. If desired, however, all or a portion of the crude product from flash zone 13 can be passed through line 21 to a suitable solid liquid separation step, e.g., a centrifugal separator or other filtration means illustrated as 22 in the flow diagram. The clarified liquid product is then passed through line 23 to product recovery zone 20. The separated catalyst metal is recovered through line 24 for recycling to the oxidation zone.

Suitable product recovery steps can be employed in zone 20, depending on the nature of the products produced. In the synthesis of vinyl acetate by the oxidation of ethylene in an acetic acid reaction medium these steps can comprise the distillation of all components boiling below acetic acid in the first stage, with subsequent distillation steps to separate the acetaldehyde by-product and azeotropic distillation of a watervinyl acetate azeotrope. The vinyl acetate is subsequently purified for recovery through line 25 as the major oxidized product. The acetaldehyde by-product also recovered can be marketed as such or preferably, can be oxidized to acetic acid for recycling to oxidation zone 2 as a supply of acetic acid thereto. The water formed in the reaction is removed through line 26.

The recycle reaction, i.e., carboxylic acid, is recovered from the product recovery zone through line 27 and recycled to the oxidation reactor 2. This reaction medium contains the amounts of platinum group metal catalyst and heavy metal redox salt that were soluble in the crude oxidate recovered from the flash zone 13. The content of this reaction medium is carefully controlled in accordance with my invention by the addition of the necessary amounts of catalytic components and halogen through line 28. Preferably, however, a continuous stream of the recycle reaction medium is withdrawn through line 37 and passed to a suitable meter for the continuous analysis of halogen content as indicated at 36. The stream is returned to the main reaction medium recycle stream through line 33. The meter 36 serves to continuously indicate the halogen content of the recycle stream. Preferably, this meter also continuously controls the addition of the necessary amount of halogen through line 34 and flow control valve 35. A hydrogen halide can be employed as the source of halogen so introduced through line 34; however, when the reaction medium is indicated to have insufficient amounts of various catalytic components such as the necessary amounts of an alkali metal and/or amounts of the heavy metal redox agents, these materials can be supplied as their halogen salts through line 34 also.

While the preceding discussion has described the continuous analysis of the reaction medium recycle stream for halogen content or addition of halogen thereto, it is within the scope of my invention to interpose this analysis and control at any point in the system, e.g., in line 19, in reactor 2, in flash zone 13, or in line 12. In a similar manner, oxygen analyzer 30 can be employed to continuously measure the presence of oxygen in the vapor space of reactor 2 rather than the vapor effluent therefrom. It is of course apparent that other obvious modifications of the process can be made without departing from the scope of the described invention.

The following examples will illustrate the results obtainable when practicing my invention:

*Example 1*

The following experiment was conducted to demonstrate the dependency of the solubility of cuprous chloride on the halogen content of the reaction medium. To each of two 8-ounce sample bottles was added ten grams of lithium chloride and 100 grams of acetic acid. To the first of the samples was added 3.5 grams of cuprous chloride and to the second was added 4.5 grams of cuprous chloride. The bottles were placed on a mechanical tumbler and after about 2 hours, the 3.5 grams of cuprous chloride had completely dissolved to yield a dark solution. The second sample was tumbled for an additional 10 hours but not all the cuprous chloride dissolved. The ratio of total chloride to copper in the first sample was 7.75 and in the second sample was 6.25.

The first solution containing the 3.5 grams cuprous chloride and 10 grams of lithium chloride was added to a solution containing 7.5 grams lithium acetate dihydrate in 650 grams of acetic acid. The resultant solution was stable and no precipitates were formed. The solution was thereafter introduced, together with 1.0 gram palladium chloride, into an autoclave. The autoclave was closed and pressured to 500 p.s.i.g. with ethylene, heated to 300° F. and nitrogen thereafter added until 900 p.s.i.g. was reached. Then 20 pounds of oxygen was added to initiate the reaction and the reaction was continued for 25 minutes by adding oxygen and nitrogen alternately to maintain the total pressure near 900 p.s.i.g.

After the last addition of oxygen, the autoclave contents were held at 300° F. for an additional 5 minutes to insure that all oxygen was completely consumed and that the autoclave reactants were under reducing conditions. The mixture was thereafter cooled, the gases vented and the product collected as a pale-brown solution containing precipitated palladium metal but free of any precipitates of cuprous chloride. The mixture was filtered to remove the palladium precipitate and the resultant filtrate was distilled at atmospheric pressure to remove the products boiling below acetic acid and water therefrom. During the distillation, no separation of cuprous chloride took place and no mirror deposits were formed.

The following yields of products were obtained from the oxydation:

| Product | Grams | Mol Percent |
|---|---|---|
| Butenes | 11.9 | 7.6 |
| Ethyl chloride | 5.5 | 2.9 |
| Acetaldehyde | 39.3 | 30.8 |
| Methyl acetate | 2.7 | 1.2 |
| Ethylidene diacetate | 3.7 | 0.9 |
| Vinyl acetate | 141.8 | 58.4 |

When the experiment is repeated with a lower ratio of total chloride ion to copper, i.e., of 6.5 or less, cuprous chloride precipitates in the reaction medium during distillation.

The preceding examples are intended solely to illustrate a mode for practicing my invention and to demonstrate the results thereby obtainable. The examples are not intended to be construed as unduly limiting of my invention that is defined by the method steps and their apparent equivalents set forth in the following claims.

I claim:

1. The oxidation of an olefin having 2 to about 5 carbons to an unsaturated ester of an alkanoic acid having 2 to about 10 carbons that comprises contacting, in a reaction zone, said olefin with oxygen in the presence of a substantially anhydrous organic reaction medium comprising said alkanoic acid and (1) between about 0.04 and about 2.0 weight percent of a platinum group metal, (2) between about 0.05 and about 5.0 weight percent of a halogen containing compound selected from the class consisting of chlorine and bromine containing compounds, (3) between about 0.1 and about 10 weight percent of an alkali metal salt of said alkanoic acid, (4) between about 0.1 and about 5.0 weight percent of a soluble salt of a multivalent metal having an oxidation potential more positive than the platinum group metal in the solution;

said contacting being at a temperature between about 30° and about 300° centigrade and a pressure between about 1 and 100 atmospheres, sufficient to maintain liquid phase conditions and wherein the relative feed rates of said olefin and said oxygen are controlled to maintain the oxygen content of the gas phase of said reaction zone less than 1 volume percent so as to obtain a crude reaction product containing said unsaturated ester, withdrawing a liquid effluent from said reaction zone, containing platinum group metal and said multivalent metal in a reduced state, distilling said liquid effluent to recover said unsaturated ester from a liquid residue containing said platinum group metal and multivalent metal, returning said residue to said reaction zone, and preventing the precipitation of said multivalent metal as an insoluble salt during said oxidation and distillation by maintaining the atomic ratio of halogen to said multivalent metal greater than about 6.5:1 in said reaction medium.

2. The method of claim 1 wherein said olefin is ethylene, said alkanoic acid is acetic, said unsaturated ester is vinyl acetate and said multivalent metal is copper.

3. The oxidation of claim 1 wherein the oxygen content of said gas phase is maintained less than about 0.5 percent.

4. The oxidation of an olefin having 2 to about 5 carbons to an unsaturated ester of an alkanoic acid having 2 to about 10 carbons that comprises contacting, in a reaction zone, said olefin with oxygen in the presence of a substantially anhydrous organic reaction medium comprising said alkanoic acid and (1) between about 0.04 and about 2.0 weight percent of a platinum group metal, (2) between about 0.05 and about 5.0 weight percent of a halogen containing compound selected from the class consisting of chlorine and bromine containing compounds, (3) between about 0.1 and about 10 weight percent of an alkali metal salt of said alkanoic acid, (4) between about 0.1 and about 5.0 weight percent of a soluble salt of a multivalent metal having an oxidation potential more positive than the platinum group metal in the solution;

said contacting being at a temperature between about 30° and about 300° centigrade and a pressure between about 1 and 100 atmospheres, sufficient to maintain liquid phase conditions so as to obtain a crude reaction product; contacting said crude reaction product with a reducing gas selected from the class consisting of carbon monoxide, hydrocarbon olefins having 2 to about 5 carbons and mixtures thereof to prevent the formation of tenacious deposits of the platinum group metal upon the surfaces of equipment and vessels contacted by said crude product; distilling said crude product to recover said unsaturated ester from a liquid residue containing said platinum group metal and said multivalent metal, returning said residue to said reaction zone; and preventing the precipitation of said multivalent metal as an insoluble salt during said oxidation and said distillation of said crude reaction product by maintaining the atomic ratio of halogen to said multivalent metal greater than about 6.5:1 in said reaction medium.

5. The method of claim 4 wherein said olefin is ethylene, said alkanoic acid is acetic, said unsaturated ester is vinyl acetate and said multivalent metal is copper.

6. The method of claim 5 wherein said crude reaction product is contacted with ethylene as said reducing gas.

References Cited by the Examiner

UNITED STATES PATENTS

| | | | |
|---|---|---|---|
| 2,987,378 | 6/1961 | Thoma | 260—597 |
| 3,076,032 | 1/1963 | Riemenschneider | 260—597 |

FOREIGN PATENTS

| | | |
|---|---|---|
| 608,610 | 3/1962 | Belgium. |
| 628,733 | 8/1963 | Belgium. |
| 137,511 | 4/1960 | U.S.S.R. |

OTHER REFERENCES

Smidt: Angew. Chim., vol. 71, pp. 176–182 (1959).

Smidt: Chemistry and Industry, Jan. 13, 1962, pp. 54–61.

Moiseev: Doklady Akademii Nauk SSSR, vol. 133, pp. 377–380 (1960).

LORRAINE A. WEINBERGER, *Primary Examiner.*

LEON ZITVER, *Examiner.*

D. P. CLARKE, V. GARNER, *Assistant Examiners.*